(12) United States Patent
Baig et al.

(10) Patent No.: US 11,610,414 B1
(45) Date of Patent: Mar. 21, 2023

(54) TEMPORAL AND GEOMETRIC CONSISTENCY IN PHYSICAL SETTING UNDERSTANDING

(71) Applicant: Apple Inc., Cupertino, CA (US)

(72) Inventors: Mohammad Haris Baig, San Jose, CA (US); Angela Blechschmidt, San Jose, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 16/795,732

(22) Filed: Feb. 20, 2020

Related U.S. Application Data

(60) Provisional application No. 62/813,374, filed on Mar. 4, 2019.

(51) Int. Cl.
| | | |
|---|---|---|
| *G06K 9/00* | (2022.01) | |
| *G06V 20/64* | (2022.01) | |
| *G06V 10/28* | (2022.01) | |
| *G06V 20/10* | (2022.01) | |
| *G06F 18/214* | (2023.01) | |

(52) U.S. Cl.
CPC .......... *G06V 20/653* (2022.01); *G06F 18/214* (2023.01); *G06V 10/28* (2022.01); *G06V 20/10* (2022.01)

(58) Field of Classification Search
None
See application file for complete search history.

(56) References Cited

U.S. PATENT DOCUMENTS

| 6,434,278 B1* | 8/2002 | Hashimoto | G06T 17/00 |
| | | | 345/583 |
| 7,221,809 B2* | 5/2007 | Geng | G06V 40/172 |
| | | | 382/280 |
| 7,746,344 B2* | 6/2010 | Grabli | G06T 15/40 |
| | | | 345/557 |

(Continued)

OTHER PUBLICATIONS

Szegedy et al., "Rethinking the inception architecture for computer vision." In Proceedings of the IEEE conference on computer vision and pattern recognition, pp. 2818-2826. 2016. (Year: 2016).*

(Continued)

*Primary Examiner* — Feng Niu
(74) *Attorney, Agent, or Firm* — Thompson Hine LLP

(57) ABSTRACT

A machine learning model is trained and used to perform a computer vision task such as semantic segmentation or normal direction prediction. The model uses a current image of a physical setting and input generated from three dimensional (3D) anchor points that store information determined from prior assessments of the physical setting. The 3D anchor points store previously-determined computer vision task information for the physical setting for particular 3D points locations in a 3D worlds space, e.g., an x, y, z coordinate system that is independent of image capture device pose. For example, 3D anchor points may store previously-determined semantic labels or normal directions for 3D points identified by simultaneous localization and mapping (SLAM) processes. The 3D anchor points are stored and used to generate input for the machine model as the model continues to reason about future images of the physical setting.

20 Claims, 6 Drawing Sheets

(56) References Cited

U.S. PATENT DOCUMENTS

| | | | |
|---|---|---|---|
| 8,477,154 B2 | 7/2013 | Davis et al. | |
| 8,588,501 B2* | 11/2013 | Miao | G06V 20/653 |
| | | | 382/132 |
| 9,881,203 B2* | 1/2018 | Hayasaka | G06T 3/60 |
| 9,916,495 B2* | 3/2018 | Hayasaka | G06V 40/172 |
| 10,127,722 B2 | 11/2018 | Shakib et al. | |
| 11,030,476 B2* | 6/2021 | Xu | G06K 9/6273 |
| 2003/0123713 A1* | 7/2003 | Geng | G06V 40/172 |
| | | | 348/47 |
| 2007/0176929 A1* | 8/2007 | Grabli | G06T 15/02 |
| | | | 345/428 |
| 2008/0212835 A1* | 9/2008 | Tavor | G06V 10/24 |
| | | | 382/103 |
| 2013/0058555 A1* | 3/2013 | Miao | G06V 10/7515 |
| | | | 382/132 |
| 2013/0156297 A1* | 6/2013 | Shotton | G06F 18/24323 |
| | | | 382/159 |
| 2014/0043329 A1* | 2/2014 | Wang | G06V 40/16 |
| | | | 345/420 |
| 2014/0307063 A1* | 10/2014 | Lee | G06V 40/165 |
| | | | 348/51 |
| 2015/0077434 A1* | 3/2015 | Fukuchi | G06F 3/011 |
| | | | 345/633 |
| 2016/0026253 A1 | 1/2016 | Bradski et al. | |
| 2016/0217318 A1* | 7/2016 | Hayasaka | G06V 40/172 |
| 2017/0140211 A1* | 5/2017 | Hayasaka | G06V 20/647 |
| 2017/0143249 A1 | 5/2017 | Davis et al. | |
| 2018/0012411 A1 | 1/2018 | Richey et al. | |
| 2019/0130275 A1* | 5/2019 | Chen | G06N 3/044 |
| 2019/0147298 A1* | 5/2019 | Rabinovich | G06N 3/045 |
| | | | 382/157 |
| 2019/0253724 A1* | 8/2019 | Nelson | H04N 19/27 |
| 2019/0265734 A1* | 8/2019 | Liu | G06V 20/176 |
| 2019/0279393 A1* | 9/2019 | Ciuc | G06V 40/165 |
| 2020/0005486 A1* | 1/2020 | Sinha | G06T 7/337 |
| 2020/0147804 A1* | 5/2020 | Sugiyama | G06T 7/73 |
| 2020/0175311 A1* | 6/2020 | Xu | B62D 15/0285 |
| 2020/0226786 A1* | 7/2020 | Fitzgibbon | G06N 20/20 |
| 2021/0074004 A1* | 3/2021 | Wang | G06T 7/73 |

OTHER PUBLICATIONS

Bucher et al., "Semantic bottleneck for computer vision tasks." In Asian Conference on Computer Vision, pp. 695-712. Springer, Cham, 2018. (Year: 2018).*

Keller, "Fuzzy logic rules in low and mid level computer vision tasks." In Proceedings of North American Fuzzy Information Processing, pp. 19-22. IEEE, 1996. (Year: 1996).*

Madhavan et al., "Automatic extraction of shadow regions in high-resolution ADS40 images-by robust approach of feature spaces analysis." (2004). (Year: 2004).*

Eigen et al., "Predicting depth, surface normals and semantic labels with a common multi-scale convolutional architecture." In Proceedings of the IEEE international conference on computer vision, pp. 2650-2658. 2015. (Year: 2015).*

Xu et al., "Self-supervised domain adaptation for computer vision tasks." IEEE Access 7 (2019): 156694-156706. (Year: 2019).*

Sinha et al., "Deep learning for computer vision tasks: a review." arXiv preprint arXiv: 1804.03928 (2018). (Year: 2018).*

Levinkov et al., "Joint graph decomposition & node labeling: Problem, algorithms, applications." In Proceedings of the IEEE Conference on Computer Vision and Pattern Recognition, pp. 6012-6020. 2017. (Year: 2017).*

* cited by examiner

TEMPORAL AND GEOMETRIC CONSISTENCY IN PHYSICAL SETTING UNDERSTANDING

CROSS-REFERENCE TO RELATED APPLICATION

This application claims the benefit of U.S. Provisional Application Ser. No. 62/813,374 filed Mar. 4, 2019, which is incorporated herein in its entirety.

TECHNICAL FIELD

The present disclosure generally relates to computer vision, and in particular, to systems, methods, and devices for implementing machine learning/prediction computer vision techniques that provide temporal and geometric consistency in physical setting (e.g., scene) understanding.

BACKGROUND

Like human vision, computer vision tasks generally attempt to reason from one or more images. The machine learning models used for such tasks, however, often have very limited information about the objects in a particular image when reasoning about the image. For example, during a sequence of images captured by an image capture device, a machine learning model may be used on each individual image to provide semantic labels for the content in each image. The model may accurately label content in images of the sequence that include entire objects, objects related to one another, and other object distinguishing features, such as an image of the entire room that includes tables, chairs, lamps, etc. However, the model may be considerably less accurate in labelling content in images that depict small portions of surfaces and other objects, such as an image that is a close up depicting only a relatively small portion of a table surface or wall. This inaccuracy can result from the limited object distinguishing features provided in close-ups and other images that have few items, few features, or otherwise have few object distinguishing features. Existing machine learning models do not adequately address this lack of object distinguishing information and thus may be less accurate, efficient, or effective than desired in many circumstances.

SUMMARY

In some implementations, a machine learning model is trained and used to perform a computer vision task such as semantic segmentation or normal direction prediction. The machine learning model uses a current image of a physical setting and input generated from three dimensional (3D) anchor points that store information determined from prior assessments of the physical setting. The 3D anchor points store previously-determined computer vision task information for the physical setting for particular 3D point locations in a 3D worlds space, e.g., an x, y, z coordinate system that is independent of image capture device's poses. For example, 3D anchor points may store previously-determined semantic labels or normal directions for 3D points identified by simultaneous localization and mapping (SLAM) processes. As a specific example, a point at 3D world space position $x_1$, $y_1$, $z_1$, may have been previously identified as a feature point by SLAM and then given the label "table" and the normal $N_1$ based on a machine learning analysis of one or more prior images of the physical setting.

The 3D anchor points are stored and used to generate input for the machine model as the model continues to reason about future images of the physical setting. For example, the information that a 3D anchor point was previously labeled "table" and assigned normal $N_1$ can guide a determination of how to label and assess the normal direction for a pixel in a current image that corresponds to that 3D anchor point, e.g., making it more likely that the machine learning model will predict the pixel's label to be "table" and its normal direction to be $N_1$. Using such techniques, prior information about the physical setting is effectively stored in a geometric representation of the physical setting (e.g., in 3D anchor points that store information about points in world space) and that prior information can be used by the machine learning model in reasoning about images of the physical setting. The machine learning model uses input that reflects determinations made about prior images of the physical setting, which provides temporal and geometric consistency in the physical setting understanding provided by the model.

In some implementations, an electronic device having a processor performs a method. The method stores three dimensional (3D) anchor points that were determined based on a first image of a physical setting obtained by an image capture device. The 3D anchor points associate 3D locations with computer vision task data. In some implementations, the 3D anchor points associate semantic labels determined for pixels using a machine learning model with 3D point locations determined by SLAM processes. This can involve mapping the pixel-based computer vision data into a 3D world space based on image capture device intrinsics (e.g., focal length, distortion, etc.) and extrinsics (e.g., camera pose) so that it can be associated with the 3D points identified by SLAM processes. In some implementations, the 3D anchor points are determined by using the first image to determine a pose of the image capture device during capture of a first image (e.g., location and orientation of a camera in 3D world space), 3D locations of features determined by detecting features in a physical setting (e.g., corners, edges, and other detected features in the 3D world space), and computer vision task data (e.g., semantic labels and normal directions) for portions (e.g., pixels) of the first image. The 3D anchor points are determined, in this example, by associating the computer vision task data for the portions of the first image with the 3D locations, using the pose and image capture device intrinsics to translate computer vision task data from camera viewpoint locations to the 3D locations in the 3D world space.

The method uses the 3D anchor points that are stored for a physical setting to reason about additional images of the physical setting. For example, the method may obtain a second image of the physical setting from the image capture device and perform a computer vision task via a machine learning model using the second image of the physical setting and input generated from the 3D anchor points. In some implementations, the input generated from the 3D anchor points can itself be an image, e.g., a 3D anchor point-based image, that is determined by projecting the 3D anchor points into the same camera viewpoint as the second image based on the camera intrinsics and extrinsics.

In some implementations, the input generated from the 3D anchor points allows the machine learning model to account for occlusion. In an example, the input may be an image that includes or represents multiple volumes that allow the model to account for occlusion. In an example, such an image includes 3D anchor point-based data for individual image pixels at multiple depths away from the image capture device. In another example, such an image includes or represents a first volume of data for a first set of the 3D anchor points (e.g., 3D anchor points closest to the image capture device along projection lines corresponding to the individual pixels) and a second volume of data for a second set of the 3D anchor points (e.g., anchor points, if any, that are not the closest to the image capture device along the projection lines corresponding to the individual pixels).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
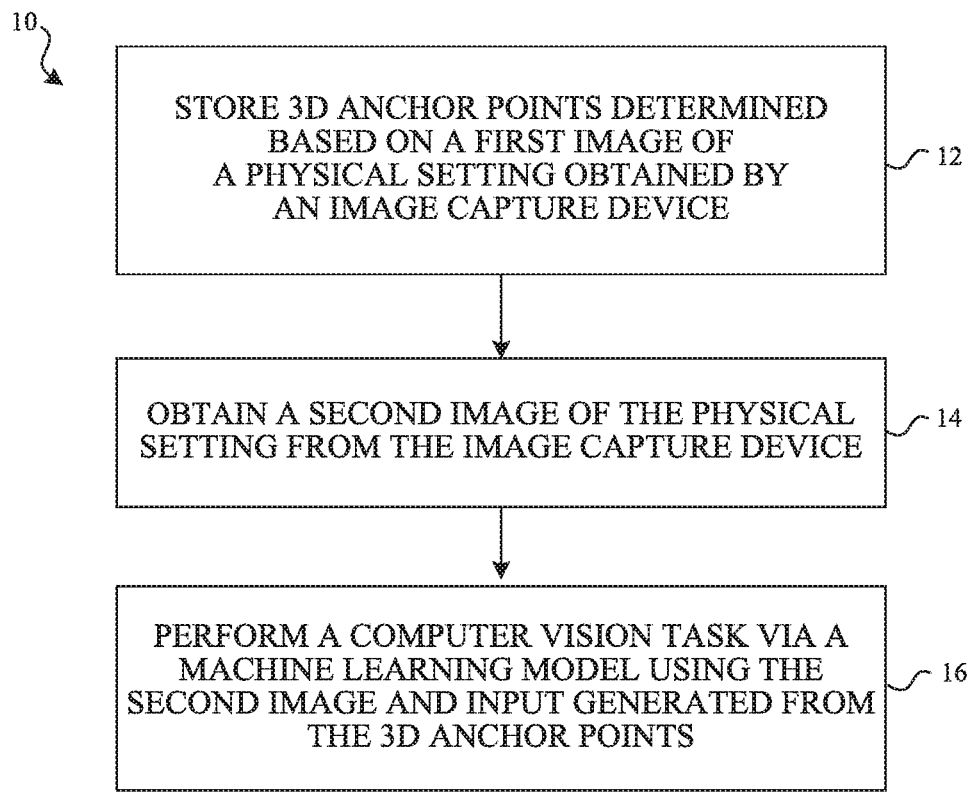
FIG. 1 is a flowchart representation of a method of performing a computer vision task for an image using 3D anchor points in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a flowchart representation of a method 10 of performing a computer vision task for an image using 3D anchor points in accordance with some implementations. In some implementations, the method 10 is performed by a device (e.g., device 1000 of FIG. 10). The method 10 can be performed at a mobile device, head mounted device (HMD), desktop, laptop, or server device. In some implementations, the method 10 is performed by processing logic, including hardware, firmware, software, or a combination thereof. In some implementations, the method 10 is performed by a processor executing code stored in a non-transitory computer-readable medium (e.g., a memory).

At block 12, the method 10 stores three dimensional (3D) anchor points that were determined based on a first image of a physical setting obtained by an image capture device. The 3D anchor points associate 3D locations with computer vision task data. In some implementations, the 3D anchor points associate semantic labels determined for pixels using a machine learning model with 3D point locations determined by SLAM processes. In some implementations, the 3D anchor points associate normal directions determined for pixels using a machine learning model with 3D point locations determined by SLAM processes. In some implementations, the 3D anchor points associate other types of computer vision data determined for pixels using a machine learning model with 3D point locations determined by SLAM processes. In some implementations, the 3D anchor points associate multiple types of computer vision data with 3D point locations determined by SLAM processes. An example technique for determining 3D anchor points is discussed with respect to FIG. 2.

At block 14, the method 10 obtains a second image of the physical setting from the image capture device. In some implementations, the image is a live image captured by an image capture device (e.g., a camera) that is part of the device that is performing method 10. For example, a device, such as device 1000 of FIG. 10, may receive images from one or more image capture devices (e.g., image sensor system(s) 1014). In some implementations, the image capture device captures a sequence of images (e.g., video frames) some or all of which are to be rendered on a display (e.g., display(s) 1012) of the device. The computer vision task (e.g., segmentation, normal direction estimation, etc.) may also be performed on some or all of the images of such a sequence of images.

At block 16, the method 10 performs a computer vision task via a machine learning model (e.g., a neural network) using the second image and input generated from the 3D anchor points. In some implementations, the input generated from the 3D anchor points can itself be an image, e.g., a third image/3D anchor point-based image, that is determined by projecting the 3D anchor points based on the camera intrinsics (e.g., focal length or distortion parameters of the image capture device) and extrinsics (e.g., a second pose of the image capture device during capture of the second image) associated with the second image. The third image may include or represent multiple channels (e.g., color channels) storing, for example, 3D coordinate data, surface normal data, and semantic label data of the 3D anchor points corresponding to particular pixel locations given the intrinsics and extrinsics of the image capture device for the second image. In some implementations, the third image includes a tensor storing 3D coordinate data, surface normal data, and semantic label data of the 3D anchor points corresponding to particular pixel locations given the intrinsics and extrinsics of the image capture device for the second image.

The third image may be formed based on spatial quantization of space into coarse regions. Doing so may avoid inaccuracies resulting from pixel offsets. In some implementations, a "3D anchor point" represents a 3D area such as a bounding cube having a size (e.g., 1 cubic mm, 1 cubic cm, etc.) that is selected to balance pixel-offset inaccuracies with prediction precision for the particular use case of the machine learning model or other circumstances.

In some implementations, the input generated from the 3D anchor points allows the machine learning model to account for occlusion. In an example, the input may be an image that includes or represents multiple volumes that allow the model to account for occlusion. In an example, such an image includes 3D anchor point-based data for individual image pixels at multiple depths away from the image capture device. In another example, such an image includes or represents a first volume of data for a first set of the 3D anchor points (e.g., 3D anchor points closest to the image capture device along projection lines corresponding to the individual pixels) and a second volume of data for a second set of the 3D anchor points (e.g., anchor points, if any, that are not the closest to the image capture device along the projection lines corresponding to the individual pixels).

In a semantic segmentation example, the machine learning model produces an output image that predicts a label for each pixel of the image. In another semantic segmentation example, the machine learning model produces an output image that represents likelihoods that each pixel of the input image should be given a particular label, e.g., chair, table, wall, ceiling, etc. The output image can include multiple probability distributions, e.g., per portion probability distributions, per column probability distributions, per pixel probability distributions, etc. In a normal direction estimation example, the machine learning model produces an output image that predicts surface normal direction values for image portions/pixels.

A machine learning model, e.g., a neural network, can be trained using labelled training data. For example, training an exemplary machine learning model can use input images that are labelled/annotated with labelled semantics and for which depth information relative to image capture device pose is known. The depth information may be known, for example, based on the images having been captured with a RGB-D camera or using a depth sensor that gives distances from the sensor. The depth information can be used to determine/estimate normal directions. In addition, the depth information along with image capture device pose information, can be used to create training 3D anchor points, for example, by associating the labelled semantics and normal directions with positions in a 3D world space. In some implementations, edges, corners, and other distinguishable feature points in the semantics/normal direction labelled images are identified and associated with 3D world space locations based on depth and pose information. The semantics and normal direction labels can be stored in these training 3D anchor points so that the training data set includes labelled images and corresponding 3D anchor points. The machine learning model can then be trained to use an input image and input generated based on the anchor points to perform a computer vision task.

Unlike existing systems in which machine learning models often have very limited contextual information about some or all of the objects in a particular image when reasoning about the image, the method 10 and other techniques disclosed herein store and use information from prior determinations about a physical setting to enable a machine learning model to make context-aware determinations about an image. Thus, when a given image depicts only a small portion of a table surface or wall that includes few, if any, object distinguishing features, the machine learning model may be given data based on 3D anchor points that reflect a more contextually-rich determination from one or more prior images of the physical setting. For example, such prior images may be based on images taken from further away from the wall in which a ceiling border, corners, other objects, or other information in the images enables the model to determine that a point on the wall should be labelled "wall." This information is stored as a 3D anchor point. When analyzing the new image that is a close of the wall, the machine learning algorithm receives information generated from this anchor point, e.g., another image depicting a pixel location corresponding to the anchor point location that has the "wall" label. The machine learning algorithm uses this information to make a more contextually-aware and otherwise improved computer vision assessment.

In addition to potentially improving the performance of a machine learning model with respect to performing computer vision tasks, some implementations provide a link between world space information associated with feature information and camera space information that includes computer vision results. This linked information has a variety of potential uses. For example, knowing semantic labels for two or more 3D anchor points can be used to connect or otherwise associate those 3D anchor points as being part of the same object. In some implementations, additional computer vision-based information is provided to supplement the feature point information identified by SLAM processes. This may provide 3D anchor points that identify features, coordinates in an image capture device 3D space (e.g., specific to a known camera pose for a particular image) of the features, coordinates in a world 3D space (e.g., the same for all images) of the features, pixels in one or more images corresponding to the features, semantic labels corresponding to the features, probability distributions for semantic labels corresponding to the features, and normal direction predictions corresponding to the features. Linking this information provides a lot of information about the setting. Moreover, this information for given anchor points can be tracked over time, for example, to determine whether two 3D anchor points move together over time as the image capture device moves or the physical setting changes and thus should considered part of a single object. In other words, linking the semantic and normal information to anchor points can be used to help distinguish between what should and should not be connected as individual objects, e.g., in a mesh. It enables the automatic identification of object specific meshes. The ability to identify object-specific meshes can be a significant improvement over prior systems that typically required a depth camera to create meshes and had very limited abilities to accurately segregate meshes for individual objects. In contrast, some implementations disclosed herein enable the creation of isolated meshes only consisting of a table, a couch, or other specific object using only data from an image capture device (e.g., a single camera) and without the need for an RGB-D or other depth camera.

Figure 2:
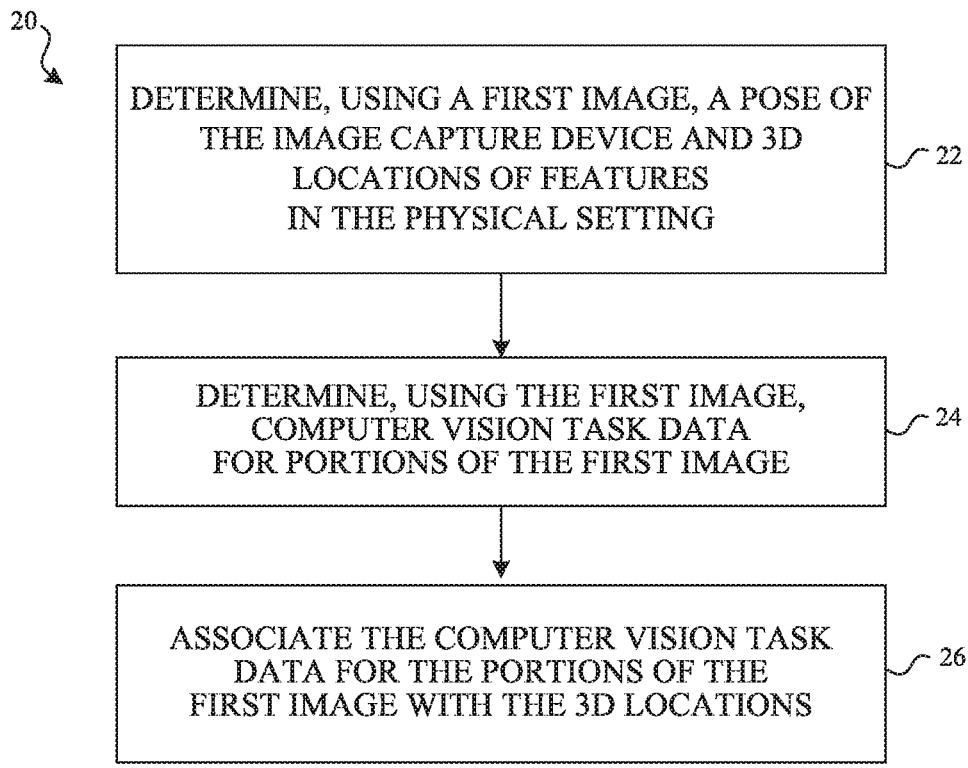
FIG. 2 is a flowchart representation of a method of determining 3D anchor points in accordance with some implementations.

FIG. 2 is a flowchart representation of a method 20 of determining 3D anchor points in accordance with some implementations. In some implementations, the method 10 is performed by a device (e.g., device 1000 of FIG. 10). The method 20 can be performed at a mobile device, head mounted device (HMD), desktop, laptop, or server device. In some implementations, the method 20 is performed by processing logic, including hardware, firmware, software, or a combination thereof. In some implementations, the method 20 is performed by a processor executing code stored in a non-transitory computer-readable medium (e.g., a memory). At block 22, the method 20 determines, using a first image, a pose of the image capture device (during capture of a first image) (e.g., location and orientation of a camera in 3D world space) and 3D locations of features (e.g., corners, edges, distinctive markings, etc.) in the physical setting (e.g., with respect to a 3D world space). In some implementations, the pose and the 3D locations are determined using a simultaneous localization and mapping (SLAM) technique. At block 24, the method 20 determines, using the first image, computer vision task data (e.g., semantic labels and normal directions) for portions (e.g., pixels) of the first image. At block 26, the method 20 associates the computer vision task data for the portions of the first image with the 3D locations of the features. This can involve using the pose and image capture device intrinsics to translate the computer vision task data from camera viewpoint locations to the 3D locations in the 3D world space.

As additional computer vision task data is determined for a particular 3D anchor point, the data can be combined with prior data. In some implementations, the data is averaged, e.g., probability distributions are averaged, normal direction predictions are averaged, etc. In another implementation, the data is used according to criteria, e.g., to use the most recent N number of data items, to use the most common result (e.g., 4 times the 3D anchor point was determined to be a table and one time it was determined to be a chair, so select table for the 3D anchor point).

Figure 3:
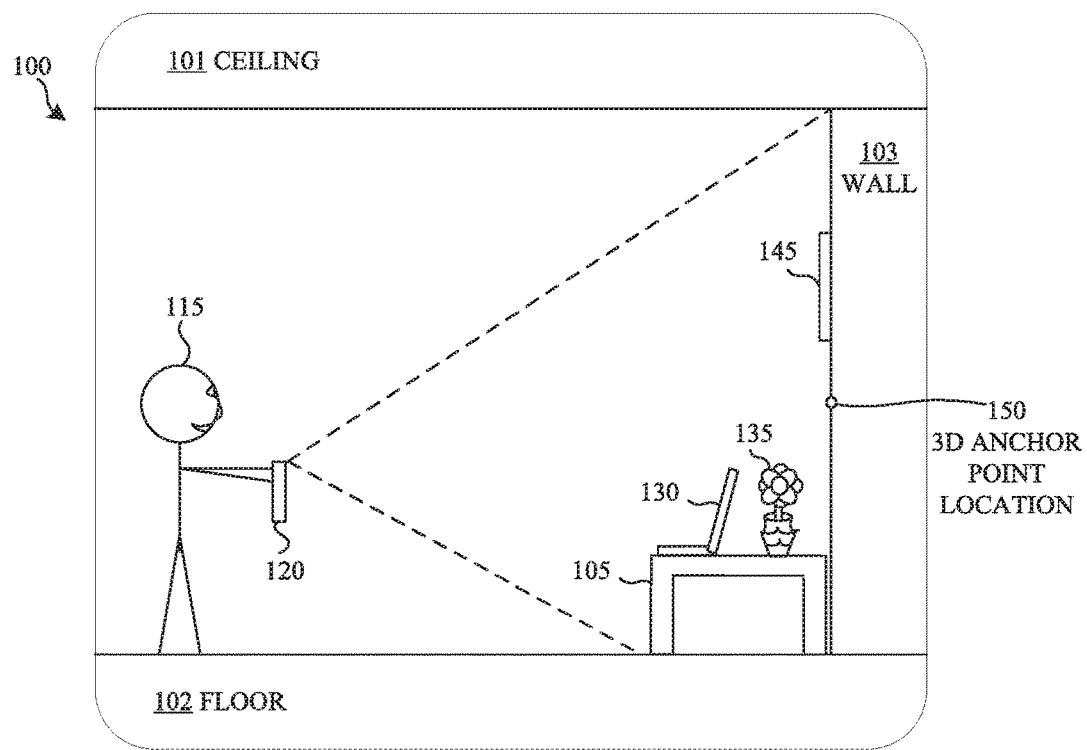
FIG. 3 is a block diagram illustrating a device capturing a first image of a physical setting under a first image capture condition.

FIGS. 3-8 illustrate an exemplary physical setting 100 in which images can be captured and reasoned about using machine learning techniques that use 3D anchor points. FIG. 3 is a block diagram illustrating a device 120 capturing a first image 125 (FIG. 4) of a physical setting 100 under a first image capture condition. In this example, the physical setting includes a ceiling 101, a floor 102, a wall 103, a table 105, a laptop 130, a vase with a flower 135, and a wall painting 145. The user 115 is depicted holding the device 120 and capturing an image of the physical setting 100. A 3D anchor point location 150 on wall 103 is depicted. This 3D anchor point location 150 corresponds to a feature on the wall, e.g., a corner, edge, marking, or other distinguishing feature that may be selected as a feature based on a characteristic likely to make the feature detectable. In some implementations, the feature is one of a set of features returned by a SLAM process. In other implementations, the 3D anchor point location 150 is selected randomly or based on any other appropriate selection criteria.

Figure 4:
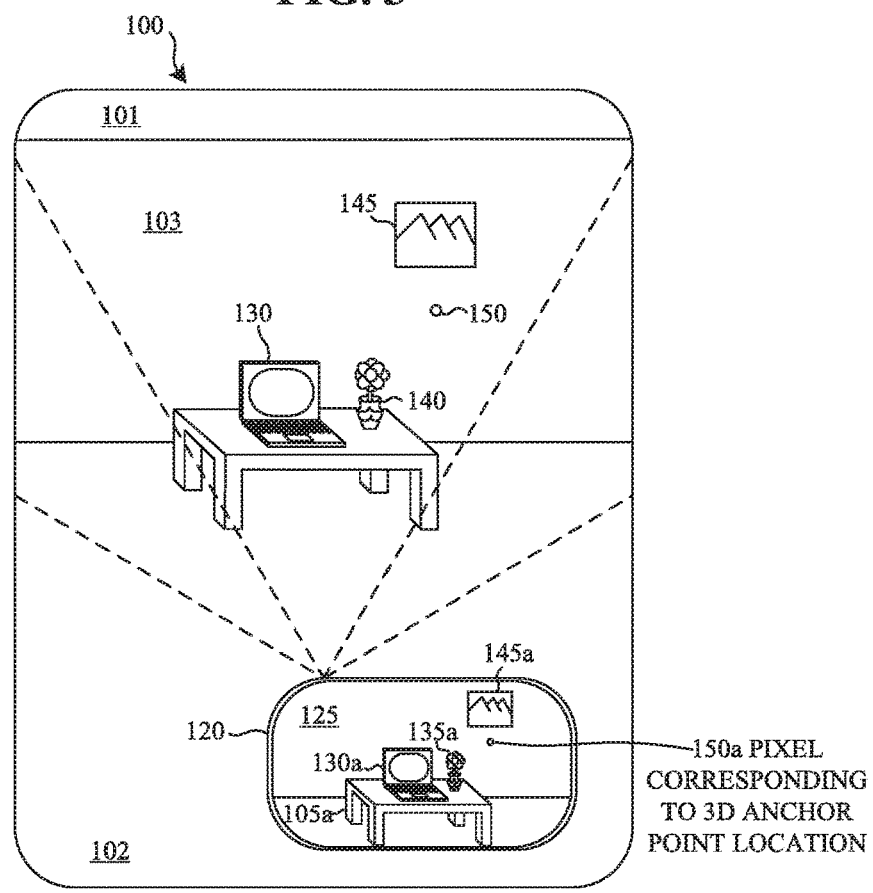
FIG. 4 is a block diagram illustrating another view of the device of FIG. 3 capturing the first image of the physical setting.

FIG. 4 is a block diagram illustrating another view of the device 120 capturing the first image 125 of the physical setting 100 under the image capture condition illustrated in FIG. 3. In this example, the first image 125 includes a table depiction 105a of table 105, a laptop depiction 130a of laptop 130, a vase with flower depiction 135a of the vase with the flower 135, and a wall painting depiction 145a of wall painting 145. The 3D anchor point location 150 on wall 103 and a corresponding pixel 150a in the first image 125 are also depicted.

The first image 125 can be used to create a 3D anchor point according to certain implementations disclosed herein. In one example, the first image 125 is (a) processed using a SLAM technique that identifies a camera pose in a 3D world space and a feature at a location that will be used as the 3D anchor point location 150. Additional features, depth information, and other information may be determined by the SLAM technique. The first image 125 is also (b) processed using a machine learning model to identify computer vision results corresponding to portions (e.g., pixels) of the first image 125. In this example, the machine learning model identifies, among other things, a label prediction for the pixels of the first image 125 corresponding to the wall 103, e.g., giving those pixels the label "wall" or providing a probability distribution that reflects a relatively high likelihood that those pixels should be labelled "wall". Similarly, the same or another machine learning model may identify that those pixels corresponding to the wall 103 should be assigned surface normal $N_1$. The technique identifies that one or more of the pixels corresponding to the wall 103 also corresponds to the 3D anchor point location 150, for example, by translating between pixel locations in the first image 125, an image capture device 3D space associated with the image capture device, or the 3D world space using extrinsics (e.g., pose) and instrinscis (e.g., information about the particular image capture device). In this way, the computer vision information about the one or more pixels can be stored as a part of a 3D anchor point that includes the 3D anchor point location 150 in a 3D world space and the computer vision information (e.g., the semantic prediction, the normal direction, etc.) identified for a corresponding pixel.

Figure 5:
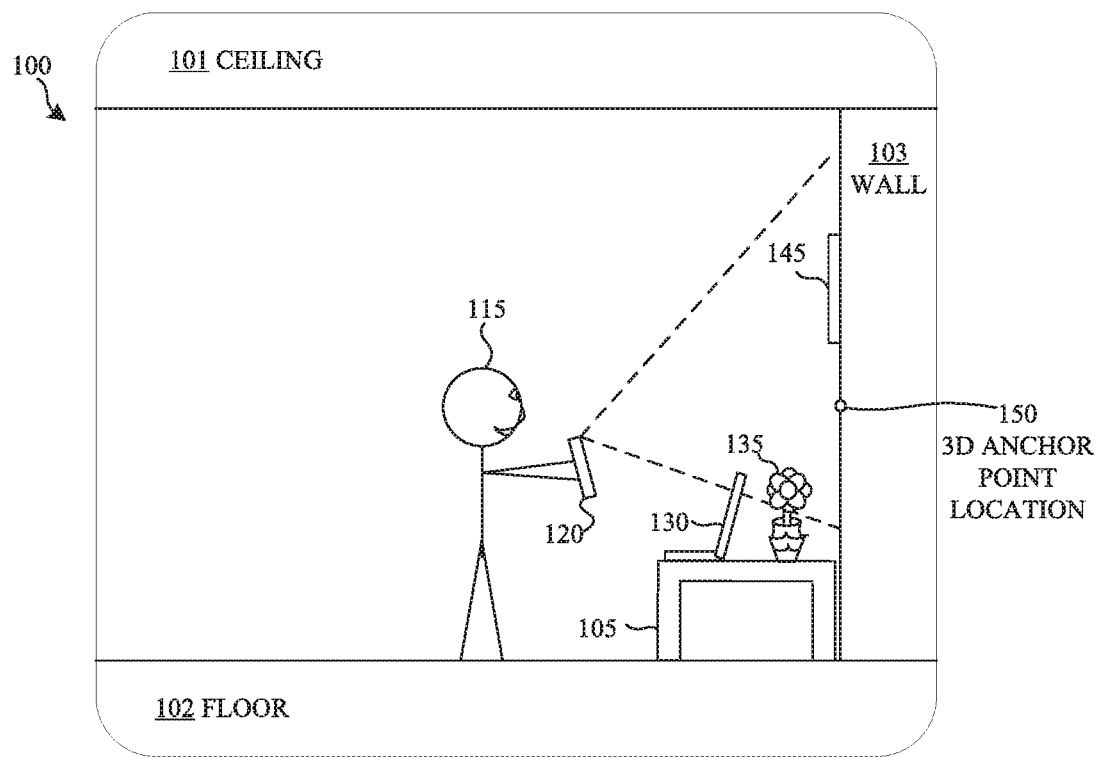
FIG. 5 is a block diagram illustrating the device of FIG. 3 capturing a second image of the physical setting under a second image capture condition.
Figure 6:
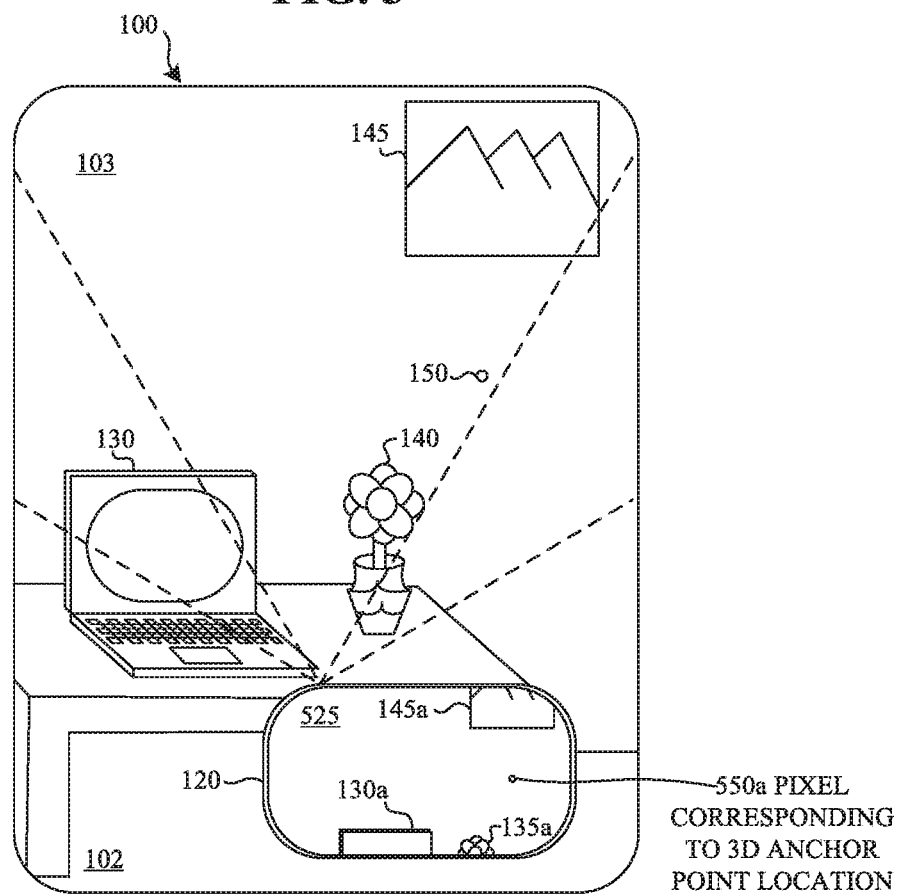
FIG. 6 is a block diagram illustrating another view of the device of FIG. 5 capturing the second image of the physical setting.

FIG. 5 is a block diagram illustrating the device 120 of FIG. 3 capturing a second image 525 (FIG. 6) of the physical setting 100 under a second image capture condition. The user 115 is depicted holding the device 120 and capturing the second image 525 of the physical setting 100. A comparison of FIGS. 3 and 5 reveals that the image capture condition of the first image 125 of FIG. 3 differs from the image capture condition of the second image 525 of FIG. 5. Specifically, the device 120 is significantly closer to wall 103 in FIG. 5 than in FIG. 3. FIG. 6 is a block diagram illustrating another view of the device 120 capturing the second image 525 of the physical setting 100 under the image capture condition illustrated in FIG. 5.

In the example of FIGS. 5 and 6, a machine learning model is used to perform a computer vision task on the second image 525 using the 3D anchor point that was created in the example of FIGS. 3 and 4. The second image 525 and input (e.g., a third image) generated using the 3D anchor point (e.g., as well as any other anchor points in the physical setting 100 or otherwise determined to be relevant) are input to the machine learning model. The input generated based on the 3D anchor point may include pixels that correspond to pixels in the second image 525. Thus, the input generated based on the 3D anchor points may be a third image that includes the 3D anchor point at the same pixel as the pixel corresponding to the anchor point location 550a in the second image 525.

The machine learning model performs the computer vision task using this information, for example, producing semantic labels, normal directions, etc. In this example, the machine learning model produces semantic label predictions (e.g., "wall") and surface normal direction predictions (e.g., $N_1$) for the pixels of the second image 525 corresponding to wall 103. The machine learning model may be able to produce these inferences/predictions more accurately, efficiently, and effectively than prior techniques because the model is able to use information from the prior determination of FIGS. 3 and 4, which was embodied in the 3D anchor point. For example, the input generated based on the 3D anchor point may provide guidance that pixel 550a corresponding to the 3D anchor point location 150 is likely to be a wall and have surface normal $N_1$. The machine learning model may thus be able to make an accurate prediction even in circumstances in which the close-up context of the second image 525 results in a second image 525 that would otherwise lack object distinguishing information sufficient to accurately predict that the pixels are likely a "wall" with surface normal direction $N_1$.

Figure 7:
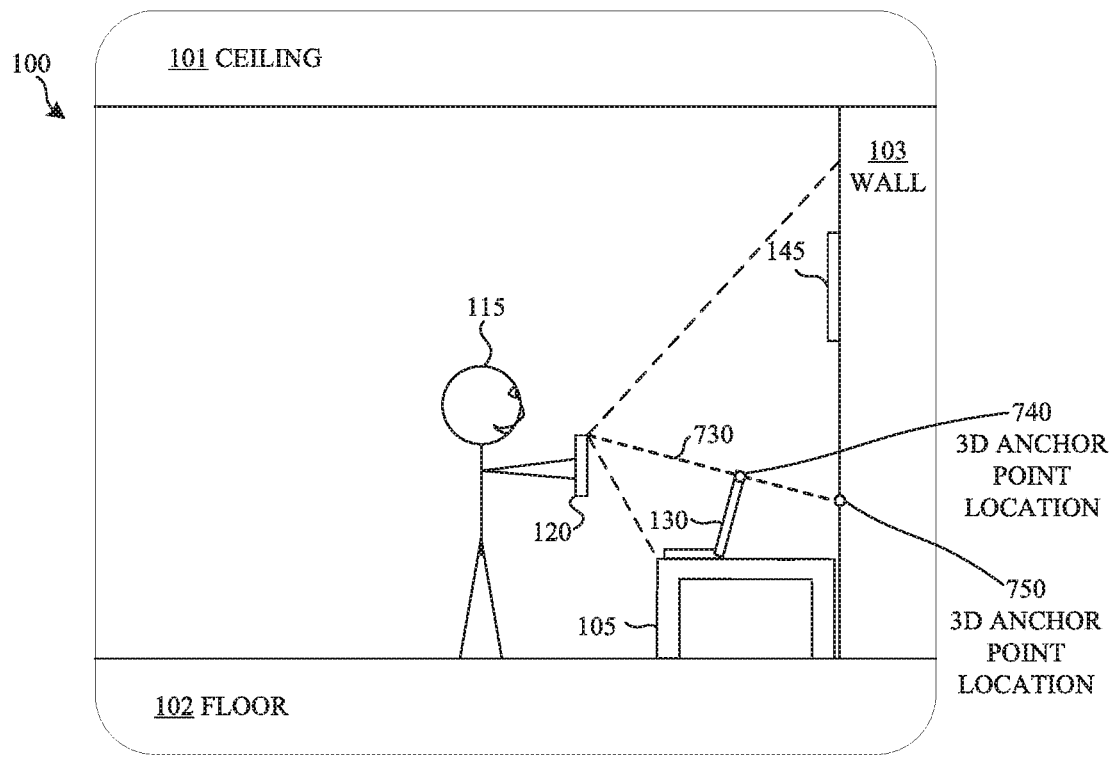
FIG. 7 is a block diagram illustrating the device of FIG. 3 capturing a fourth image of the physical setting under another image capture condition.

FIG. 7 is a block diagram illustrating the device 120 of FIG. 3 capturing a fourth image 725 (FIG. 8) of the physical setting 100 under another image capture condition. The physical setting 100 includes a first anchor point location 740 and a second anchor point location 750 that are on the same projection line 730 from the image capture device 120. In the fourth image 725, the laptop 130 occludes a portion of the wall 103, e.g., the depiction of the laptop 130a occludes a portion of the depiction of the wall 103a that would otherwise be depicted in the fourth image 725 if not occluded. Accordingly, in the fourth image 725 shown in FIG. 8, the pixel 750a corresponds to multiple 3D anchor point locations, e.g., to both the first anchor point location 740 and a second anchor point location 750.

Figure 8:
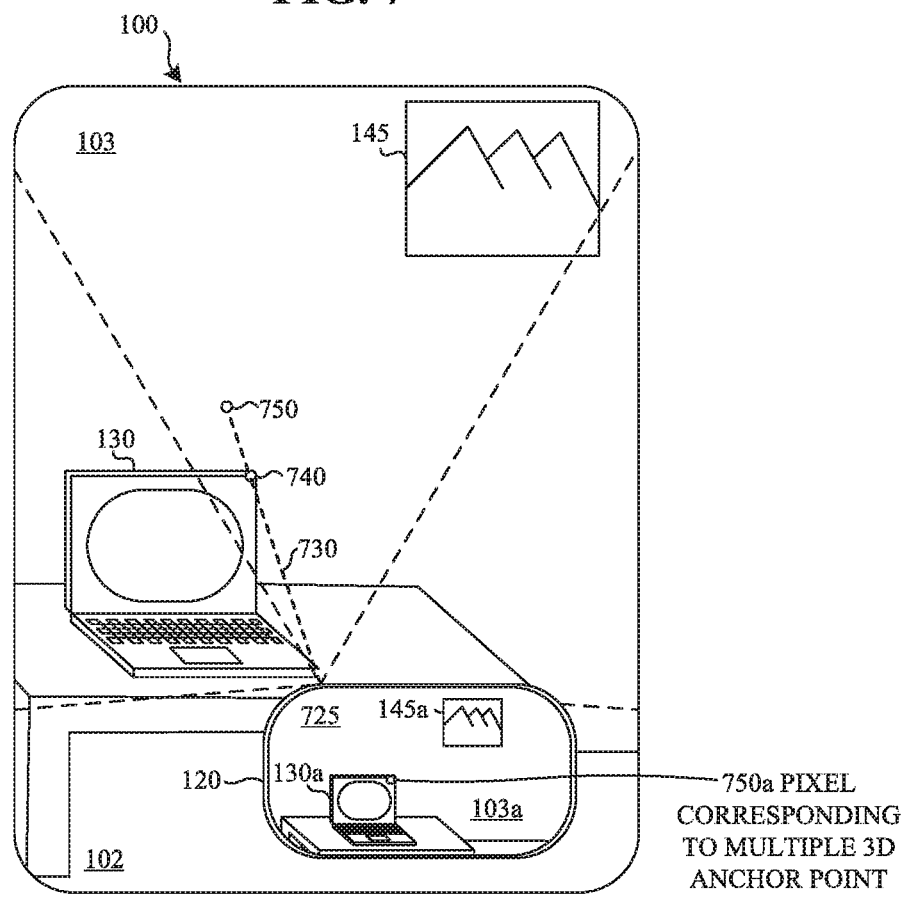
FIG. 8 is a block diagram illustrating another view of the device of FIG. 7 capturing the fourth image of the physical setting.

In the example of FIGS. 7 and 8, a machine learning model is used to perform a computer vision task on the fourth image 725 using 3D anchor points for both the first anchor point location 740 and a second anchor point location 750. Specifically, the fourth image 725 and input (e.g., a fifth image) generated using the 3D anchor points are input to the machine learning model. The input generated based on the 3D anchor points may include pixels (e.g., a tensor or other multi-channel data structure) that correspond to pixels in the fourth image 725. The input generated based on the 3D anchor points may be a fifth image that includes the 3D anchor points corresponding to both the first anchor point location 740 and a second anchor point location 750, for example, stored in different volumes. For example, the fifth image may include a first volume of data for a first set of the 3D anchor points (e.g., 3D anchor points along a given projection line that are closest to the camera) and a second volume of data for a second set of the 3D anchor points (e.g., 3D anchor points that are farther from the camera). Additional implementations utilize more than two volumes to account for three or more 3D anchor points that may be along a given projection line. The use of input that reflects occluded anchor points, e.g., using multiple volumes, enables the machine learning model to learn to account for occlusion in its inferences/predictions.

Figure 9:
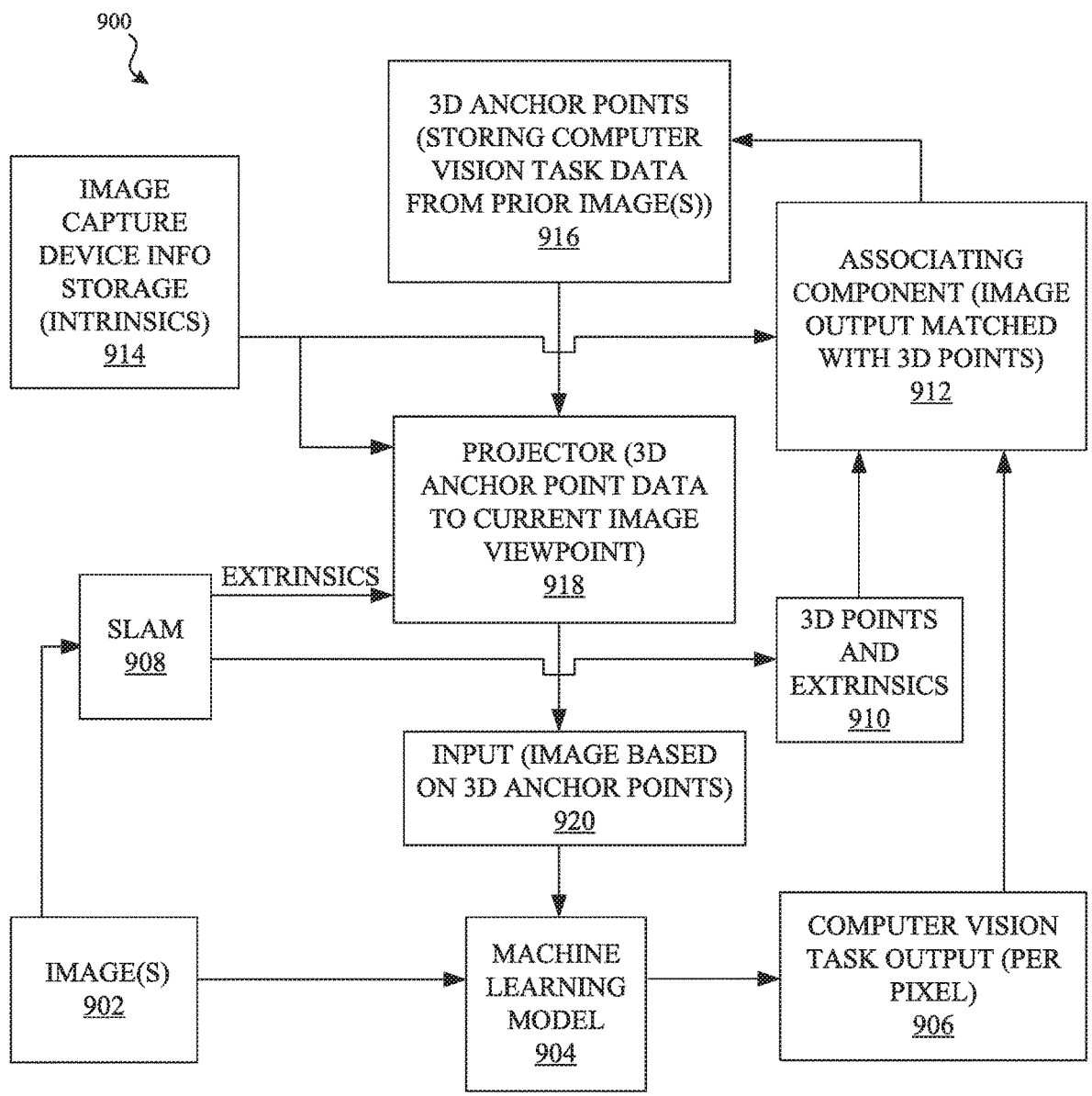
FIG. 9 is block diagram of a process that implements a machine learning model to perform a computer vision task using 3D anchor points in accordance with some implementations.

FIG. 9 is block diagram of a process 900 that implements a machine learning model to perform a computer vision task using 3D anchor points in accordance with some implementations. In this example, an image or images 902 are input to a machine learning model 904 that produces a computer vision task output 906 (e.g., per pixel semantic label predictions, per pixel surface normal direction predictions, etc.). The image or images 902 are also processed via SLAM process 908 that produces 3D points (e.g., 3D locations of features) and extrinsics (e.g., capture device pose) 910. The computer vision task output 906 and 3D points and extrinsics 910 are provided to associating component 912, which matches the computer vision image output (e.g., pixel data) with the 3D locations using the extrinsics and intrinsics from image capture device info storage 914. The associating component 912 produces 3D anchor points 916 that store the computer vision data from prior images for use with future images. These 3D anchor points 916 are then available to be used in performing the computer vision task on future images. For example, the 3D anchor points 916 can be provided to projector 918, which projects the 3D anchor point data onto a current image viewpoint to produce a 3D anchor point based image 920 that is input to the machine learning model 904 when it is used to perform the computer vision task for the future images.

Figure 10:
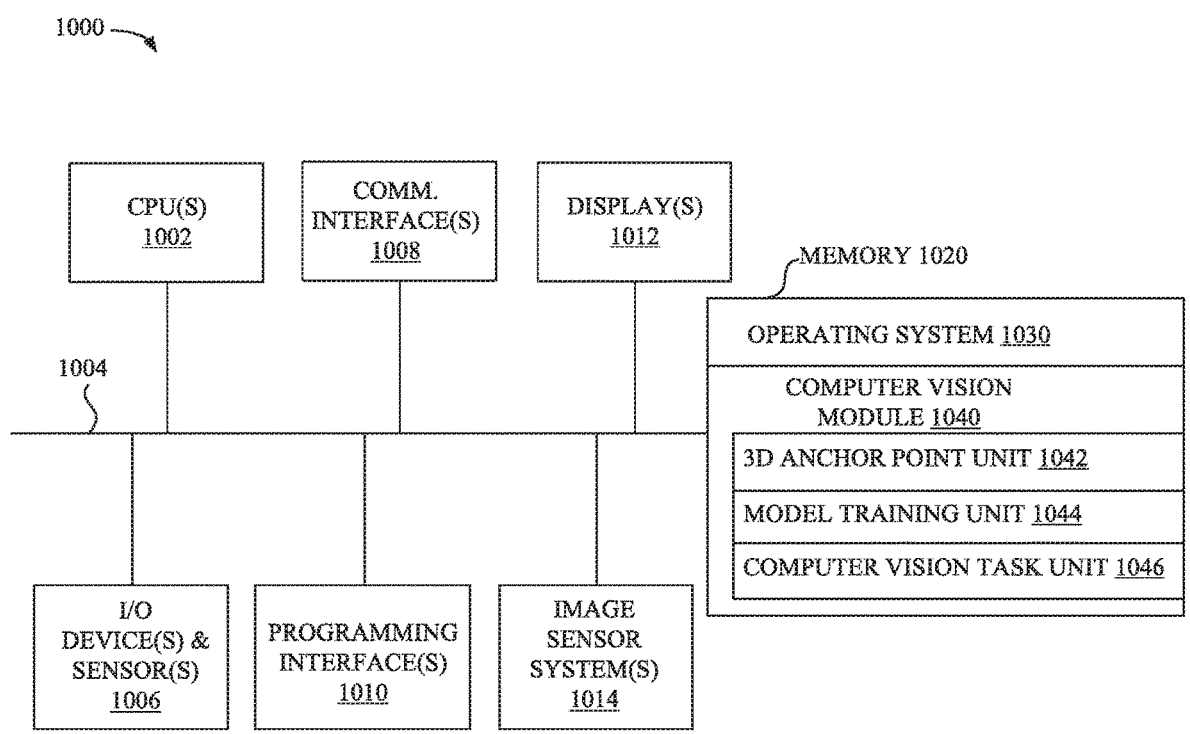
FIG. 10 is a block diagram of an example system architecture of an exemplary device in accordance with some implementations.

FIG. 10 is a block diagram of an example system architecture of an exemplary device configured to facilitate computer vision tasks in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, or the like), one or more input/output (I/O) devices and sensors 1006, one or more communication interfaces 1008 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 1010, one or more displays 1012, one or more interior or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1012 are configured to present images from the image sensor system(s) 1014. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 1012 correspond to diffractive, reflective, polarized, holographic, etc. waveguide displays. For example, the device 1000 includes a single display. In another example, the device 1000 is a head-mounted device that includes a display for each eye of the user.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and a computer vision module 1040.

The operating system 1030 includes procedures for handling various basic system services and for performing hardware dependent tasks. In some implementations, the computer vision module 1040 is configured to facilitate a computer vision task. The 3D anchor point unit is configured to create, modify, and provide 3D anchor points via one or more of the techniques disclosed herein. The model training unit 1044 is configured to train a machine learning model to perform the computer vision task, for example, using an input image and another image that is generated based on 3D anchor points. The computer vision task unit 1046 is configured to accomplish a computer vision task, for example, using the method 10 of FIG. 1. Although these modules and units are shown as residing on a single device (e.g., the device 1000), it should be understood that in other implementations, any combination of the these modules and units may be located in separate computing devices.

Moreover, FIG. 10 is intended more as a functional description of the various features which are present in a particular implementation as opposed to a structural schematic of the implementations described herein. As recognized by those of ordinary skill in the art, items shown separately could be combined and some items could be separated. For example, some functional modules and units shown separately in FIG. 8 could be implemented in a single module or unit and the various functions of single functional blocks could be implemented by one or more functional blocks in various implementations. The actual number of modules and units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the terms "or" and "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method, comprising:
    at an electronic device having a processor:
        performing a computer vision task using a first image of a physical setting obtained by an image capture device, the computer vision task determining computer vision task output values for each of multiple pixels of the first image, wherein the computer vison task output values estimate characteristics of multiple portions of the physical setting depicted by the multiple pixels of the first image;

storing three dimensional (3D) anchor points, the 3D anchor points identifying 3D locations in a 3D space and associating the 3D locations with the computer vision task output values, wherein the 3D locations are associated with the computer vision task output values based on mapping of pixel-specific data into the 3D space, wherein the mapping maps the multiple pixels of the first image to the 3D locations in the 3D space, and associating the computer vision task output values determined for the multiple pixels of the first image with the 3D locations based on the mapping;

obtaining a second image of the physical setting from the image capture device; and performing the computer vision task via a machine learning model using the second image of the physical setting and input generated from the computer vision task output values associated with the 3D locations of the 3D anchor points, wherein performing the computer vision task determines second computer vision task output values for each of multiple pixels of the second image, wherein the input corresponds to at least one of the 3D anchor points that is occluded in the second image and the machine learning model accounts for occlusion of the at least one of the 3D anchor points in determining the second computer vision task output values; and wherein the second computer vision task output values estimate characteristics of multiple portions of the physical setting depicted by the multiple pixels of the second image, wherein the computer vision task uses the input to provide consistency between:
  the computer vision task output values determined by the computer vision task using the first image; and
  the second computer vision task output values determined by the computer vision task using the second image and the input.

2. The method of claim 1, wherein the 3D anchor points are determined based on determining, using the first image, a pose of the image capture device during capture of the first image.

3. The method of claim 1, wherein:
the computer vision task output values that are determined for the multiple pixels of the first image are normal direction values determined for the multiple pixels of the first image,
wherein generating the input using the computer vision task output values comprises generating the input using the normal direction values associated with the 3D locations of the 3D anchor points, wherein the input provides output consistency between normal direction values predicted by the computer vision task using the first image and normal direction values predicted by the computer vision task using the second image.

4. The method of claim 1, wherein:
the computer vision task output values that are determined for the multiple pixels of the first image are semantic label values determined for the multiple pixels of the first image,
wherein generating the input using the computer vision task output values comprises generating the input using the semantic label values associated with the 3D locations of the 3D anchor points, wherein the input provides output consistency between semantic label values predicted by the computer vision task using the first image and semantic label values predicted by the computer vision task using the second image.

5. The method of claim 1, wherein a computer vision task value for a 3D anchor point is determined using images of the physical setting from multiple poses of the image capture device.

6. The method of claim 1, wherein the input generated from the 3D anchor points is a third image.

7. The method of claim 6, wherein the third image is determined by projecting the computer vision task data based on:
  a second pose of the image capture device during capture of the second image; and
  focal length or distortion parameters of the image capture device.

8. The method of claim 6, wherein the third image comprises multiple channels storing 3D coordinate data, surface normal data, or semantic label data of the 3D anchor points corresponding to particular pixel locations given intrinsics and extrinsics of the image capture device for the second image.

9. The method of claim 6, wherein the third image comprises a tensor storing 3D coordinate data, surface normal data, and semantic label data of the 3D anchor points corresponding to particular pixel locations given intrinsics and extrinsics of the image capture device for the second image.

10. The method of claim 6, wherein the third image is formed based on spatial quantization of space into regions having a size selected based on pixel-offset inaccuracies or a required precision.

11. The method of claim 6, wherein the machine learning model accounts for occlusion using the third image.

12. The method of claim 6, wherein the third image comprises 3D anchor point-based data for individual image pixels at multiple depths away from a second pose of the image capture device during capture of the second image.

13. The method of claim 6, wherein the third image comprises a first volume of data for a first set of the 3D anchor points and a second volume of data for a second set of the 3D anchor points.

14. The method of claim 1, wherein the computer vision task comprises semantic segmentation.

15. The method of claim 1, wherein the computer vision task comprises normal direction estimation.

16. The method of claim 1, further comprising determining a mesh for an object in the image based on the 3D anchor points.

17. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
performing a computer vision task using a first image of a physical setting obtained by an image capture device, the computer vision task determining computer vision task output values for each of multiple pixels of the first image, wherein the computer vison task output values estimate characteristics of multiple portions of the physical setting depicted by the multiple pixels of the first image;

storing three dimensional (3D) anchor points, the 3D anchor points identifying 3D locations in a 3D space and associating the 3D locations with the computer vision task output values, wherein the 3D locations are associated with the computer vision task output values based on mapping of pixel-specific data into the 3D space, wherein the mapping maps the multiple pixels of the first image to the 3D locations in the 3D space, and associating the computer vision task output values determined for the multiple pixels of the first image with the 3D locations based on the mapping;

obtaining a second image of the physical setting from the image capture device; and performing the computer vision task via a machine learning model using the second image of the physical setting and input generated from the computer vision task output values associated with the 3D locations of the 3D anchor points, wherein performing the computer vision task determines second computer vision task output values for each of multiple pixels of the second image, wherein the input corresponds to at least one of the 3D anchor points that is occluded in the second image and the machine learning model accounts for occlusion of the at least one of the 3D anchor points in determining the second computer vision task output values; and wherein the second computer vision task output values estimate characteristics of multiple portions of the physical setting depicted by the multiple pixels of the second image, wherein the computer vision task uses the input to provide consistency between:

the computer vision task output values determined by the computer vision task using the first image; and the second computer vision task output values determined by the computer vision task using the second image and the input.

18. The system of claim 17, wherein the 3D anchor points are determined based on determining, using the first image, a pose of the image capture device during capture of the first image.

19. A non-transitory computer-readable storage medium, storing program instructions computer-executable on a computer to perform operations comprising:

performing a computer vision task using a first image of a physical setting obtained by an image capture device, the computer vision task determining computer vision task output values for each of multiple pixels of the first image, wherein the computer vison task output values estimate characteristics of multiple portions of the physical setting depicted by the multiple pixels of the first image;

storing three dimensional (3D) anchor points, the 3D anchor points identifying 3D locations in a 3D space and associating the 3D locations with the computer vision task output values, wherein the 3D locations are associated with the computer vision task output values based on mapping of pixel-specific data into the 3D space, wherein the mapping maps the multiple pixels of the first image to the 3D locations in the 3D space, and associating the computer vision task output values determined for the multiple pixels of the first image with the 3D locations based on the mapping;

obtaining a second image of the physical setting from the image capture device; and performing the computer vision task via a machine learning model using the second image of the physical setting and input generated from the computer vision task output values associated with the 3D locations of the 3D anchor points, wherein performing the computer vision task determines second computer vision task output values for each of multiple pixels of the second image, wherein the input corresponds to at least one of the 3D anchor points that is occluded in the second image and the machine learning model accounts for occlusion of the at least one of the 3D anchor points in determining the second computer vision task output values; and wherein the second computer vision task output values estimate characteristics of multiple portions of the physical setting depicted by the multiple pixels of the second image, wherein the computer vision task uses the input to provide consistency between:

the computer vision task output values determined by the computer vision task using the first image; and the second computer vision task output values determined by the computer vision task using the second image and the input.

20. The non-transitory computer-readable storage medium of claim 19, wherein the 3D anchor points are determined based on determining, using the first image, a pose of the image capture device during capture of the first image.

* * * * *